(12) United States Patent
King

(10) Patent No.: US 10,387,480 B2
(45) Date of Patent: Aug. 20, 2019

(54) SYSTEMS AND METHODS FOR A SCALABLE, COLLABORATIVE, REAL-TIME, GRAPHICAL LIFE-MANAGEMENT INTERFACE

(71) Applicant: Lance M. King, Santa Clara, CA (US)

(72) Inventor: Lance M. King, Santa Clara, CA (US)

(73) Assignee: Lance M. King, Henderson, NV (US)

( * ) Notice: Subject to any disclaimer, the term of this patent is extended or adjusted under 35 U.S.C. 154(b) by 391 days.

(21) Appl. No.: 14/074,678

(22) Filed: Nov. 7, 2013

(65) Prior Publication Data

US 2014/0129971 A1 May 8, 2014

Related U.S. Application Data

(60) Provisional application No. 61/724,261, filed on Nov. 8, 2012, provisional application No. 61/724,259, filed on Nov. 8, 2012, provisional application No. 61/724,262, filed on Nov. 8, 2012.

(51) Int. Cl.
   *G06Q 10/10* (2012.01)
   *G06F 16/44* (2019.01)
   *G06F 3/048* (2013.01)

(52) U.S. Cl.
   CPC ......... *G06F 16/447* (2019.01); *G06Q 10/109* (2013.01); *G06F 3/048* (2013.01)

(58) Field of Classification Search
   CPC ............... G06F 17/30064; G06F 3/048; G06F 17/30867; G06Q 10/00; G06Q 10/06; G06Q 10/101; G06Q 10/109; Y10S 715/963

USPC .................................................. 715/772, 963
See application file for complete search history.

(56) References Cited

U.S. PATENT DOCUMENTS

| | | | |
|---|---|---|---|
| 2006/0148528 A1* | 7/2006 | Jung ................... | G06Q 10/109 455/566 |
| 2008/0114809 A1* | 5/2008 | MacBeth .............. | G06Q 10/109 |
| 2008/0155547 A1* | 6/2008 | Weber .................. | G06Q 10/109 718/102 |
| 2009/0024979 A1* | 1/2009 | Chessell ............... | G06F 9/4443 717/104 |
| 2011/0021250 A1* | 1/2011 | Ickman ............. | G06F 17/30867 455/566 |
| 2011/0252351 A1* | 10/2011 | Sikora .................. | G06Q 10/109 715/769 |
| 2012/0173985 A1* | 7/2012 | Peppel .............. | G06F 17/30973 715/730 |

(Continued)

*Primary Examiner* — Rinna Yi
(74) *Attorney, Agent, or Firm* — Procopio, Cory, Hargreaves & Savitch LLP

(57) ABSTRACT

Systems and methods for providing a scalable graphical user interface. In an embodiment, the user interface comprises a main display area that includes a timeline across a first axis and a set of content (e.g., media and/or applications) categories along a second axis that is orthogonal to the first axis, such that each content category is associated with a row or column across the timeline. As each content is created or consumed, the timeline is populated with a selectable representation of the content in the row or column associated with the content category corresponding to the content at a point on the timeline representing a time at which the content was created or consumed, such that the content is accessible to a user via the representation of the content.

18 Claims, 14 Drawing Sheets

(56) References Cited

U.S. PATENT DOCUMENTS

| | | | |
|---|---|---|---|
| 2013/0055106 A1* | 2/2013 | Tarneberg | G06Q 10/107 715/753 |
| 2014/0075390 A1* | 3/2014 | Gauthier | G06Q 10/0631 715/840 |
| 2014/0089816 A1* | 3/2014 | DiPersia | G06F 3/0484 715/753 |

* cited by examiner

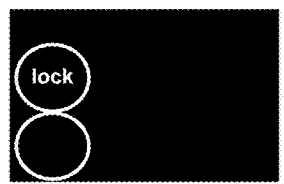 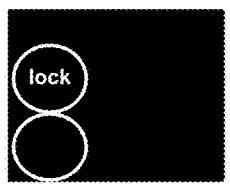 
Touch to activate → Toggles edit view as long as toggle is held → Slide to lock
FIG. 8A     FIG. 8B     FIG. 8C
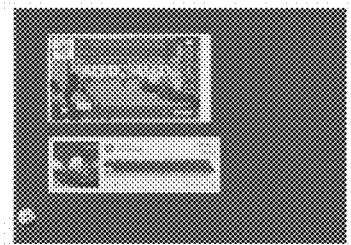 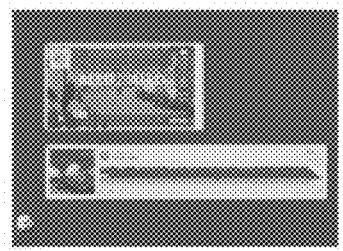 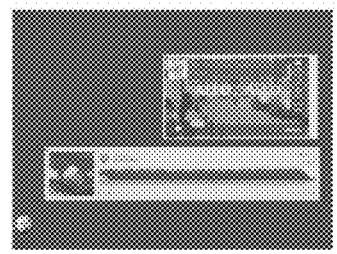
Default meta view     Pinch to resize     Drag to reposition
FIG. 9A     FIG. 9B     FIG. 9C
Edit element properties and delete elements
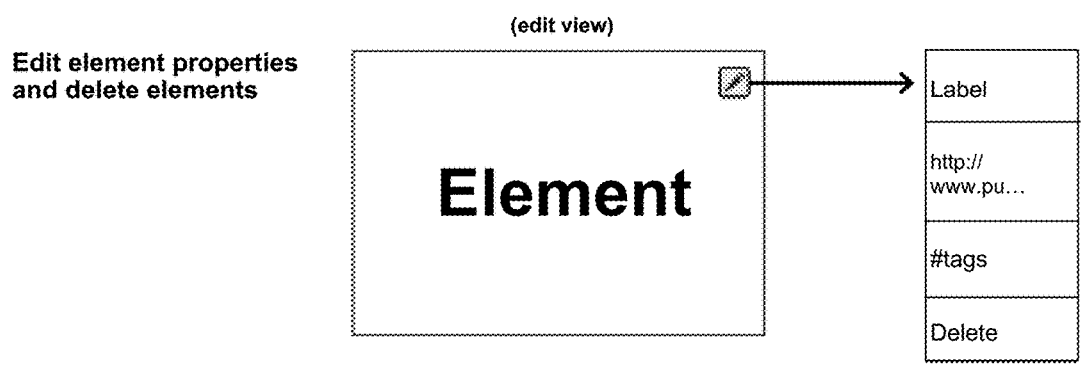
FIG. 10

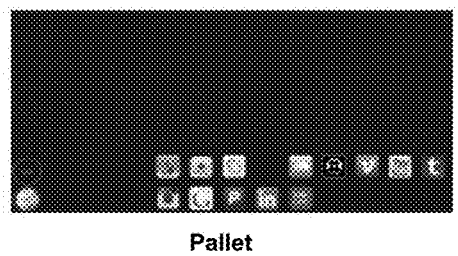
Pallet
Drag to place element
FIG. 11A          FIG. 11B
(Default View)          (Meta View)
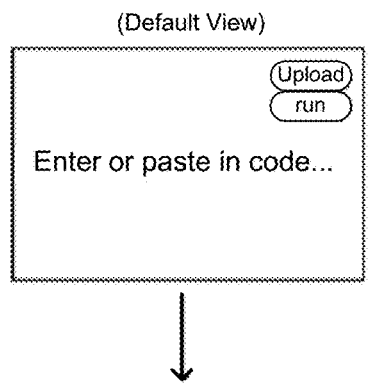          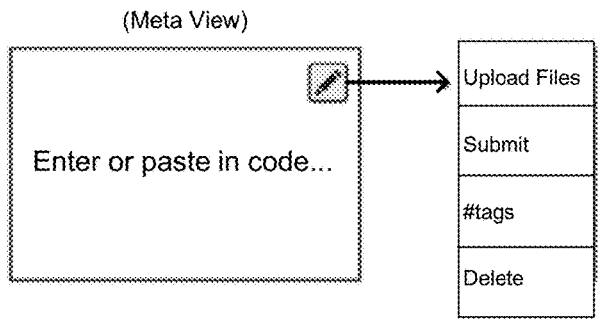
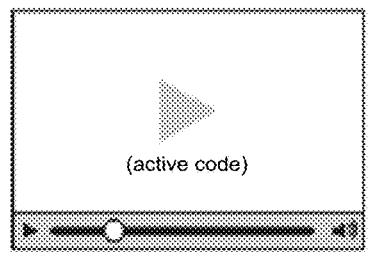
FIG. 12B
FIG. 12A

SYSTEMS AND METHODS FOR A SCALABLE, COLLABORATIVE, REAL-TIME, GRAPHICAL LIFE-MANAGEMENT INTERFACE

CROSS-REFERENCE TO RELATED APPLICATIONS

This application claims priority to U.S. Provisional Patent App. No. 61/724,259, filed on Nov. 8, 2012 and titled "Systems and Methods for a Scalable, Collaborative, Real-Time, Graphical Life-Management Interface," U.S. Provisional Patent App. No. 61/724,261, filed on Nov. 8, 2012 and titled "Systems and Methods for Contact Sorter in a Scalable, Collaborative, Real-Time, Graphical Life-Management Interface," and U.S. Provisional Patent App. No. 61/724,262, filed on Nov. 8, 2012 and titled "Systems and Methods for a Calendar Application in a Scalable, Collaborative, Real-Time, Graphical Life-Management Interface," the entireties of all of which are hereby incorporated herein by reference as if set forth in full.

BACKGROUND

Field of the Invention

The systems and methods disclosed herein relate generally to scalable, collaborative, real-time graphical life-management interface.

Description of the Related Art

The personal computing (PC) era began with text-based user interfaces. As PC technology developed, a ceiling was reached for the capability of text-based computers, and graphical user interfaces were born. Thereafter, the Internet became available, and the need arose for simplified graphical user interfaces, which could be easily transported over network communications. However, these simplified graphical user interfaces are struggling to keep up with the added functionality users are demanding from these devices. For example, these interfaces struggle to organize and manage the dozens (or hundreds) of apps that users commonly install. Further, they struggle to deal with the barrage of texts, Tweets, alerts, alarms, badges, calls and other real-time data and prompts that come to these devices. Currently, however, a new need has arisen. The ceiling for simplified, non-collaborative, non-real-time graphical user interfaces has now been reached. Conventional technology attempts to use the same static, efficiency-focused user interfaces that were ideal for event-based computing twenty years ago with today's mobile devices that are always on and always connected. The result is that the user interfaces of today's mobile devices do not scale very well as new functionality is added, and require additional interfaces such as notification centers to deal with the real-time events like text, Tweets, social media updates, and etc. Consequently, users are forced to perform lots of swiping, scrolling, navigating, and integration operations, or otherwise settle for getting less out of their devices. Thus, what is needed is a scalable, collaborative, real-time graphical user interface.

Platform providers, such as Facebook™, Google™, and Apple™, all vie to lock-in users to their proprietary platforms. However, what most users want is to use multiple social media providers and have access to all of their data across different platforms with a consistent interface. For example, users want to use Facebook™, Twitter™, and Linked-In™ on their PC at work, their Macintosh™ at home, their iPad™ on the go, and their Android™-based smart phone in their pocket without having to bounce back and forth between applications.

SUMMARY

Accordingly, disclosed herein are systems and methods for allowing users to choose their social media and platform providers, while maintaining the same, consistent, real-time interface for all of their social media, data and collaboration across all of their devices and platforms. In embodiments, the disclosed systems and methods can help users over several decades to live more effective lives by making the most of their time and their relationships.

In an embodiment, a system is disclosed. The system comprises: at least one hardware processor; and at least one software module configured to, when executed by the at least one hardware processor, display a scalable graphical user interface, the user interface comprising a main display area that includes a timeline along a first axis and a set of content categories along a second axis that is orthogonal to the first axis, such that each content category is associated with a row or column across the timeline, wherein each content category is associated with one or more of one or more types of media and one or more applications, and, as each content is created or consumed, populate the timeline with a selectable representation of the content in the row or column associated with the content category corresponding to the content at a point on the timeline representing a time at which the content was created or consumed, such that the content is accessible to a user via the representation of the content.

In another embodiment, a method is disclosed. The method comprises using at least one hardware processor to: display a scalable graphical user interface, the user interface comprising a main display area that includes a timeline along a first axis and a set of content categories along a second axis that is orthogonal to the first axis, such that each content category is associated with a row or column across the timeline, wherein each content category is associated with one or more of one or more types of media and one or more applications; and, as each content is created or consumed, populate the timeline with a selectable representation of the content in the row or column associated with the content category corresponding to the content at a point on the timeline representing a time at which the content was created or consumed, such that the content is accessible to a user via the representation of the content.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 5 illustrates a network which can be used in conjunction with the disclosed systems and methods, according to an embodiment;

FIG. 6 illustrates an example computing device which can be used in conjunction with the disclosed systems and methods, according to an embodiment;

FIG. 7 illustrates a network which can be used in conjunction with the disclosed systems and methods, according to an embodiment;

FIGS. 8A-8C illustrate a portion of a user interface, according to an embodiment;

FIGS. 9A-9C illustrate a collection panel of a user interface, according to an embodiment;

FIG. 10 illustrates a collection item or element, according to an embodiment;

FIGS. 11A and 11B illustrate a collection panel and pallet panel of a user interface, according to an embodiment;

FIGS. 12A and 12B illustrate a scripting box, according to an embodiment;

FIG. 14 illustrates a collection panel and clipboard panel, according to an embodiment;

DETAILED DESCRIPTION

The disclosed systems and methods solve the scalability and user interface problems described above, by creating the world's first real-time user interface (RTUI) that also incorporates effectiveness principles to help users make the most of their time and their lives. These systems and methods make it easy to aggregate messaging systems, address books, and more, from multiple social media providers. This aggregation can be done all at the same time and all in real-time from a single screen without a lot of user operations, such as swiping, scrolling, or navigating. In an embodiment, a dashboard of aggregated social and other media is provided which provides real-time feedback on what is happening in a user's life. The dashboard can be timeline-based, allowing users to move forwards and backwards in time at any moment.

Figure 1:
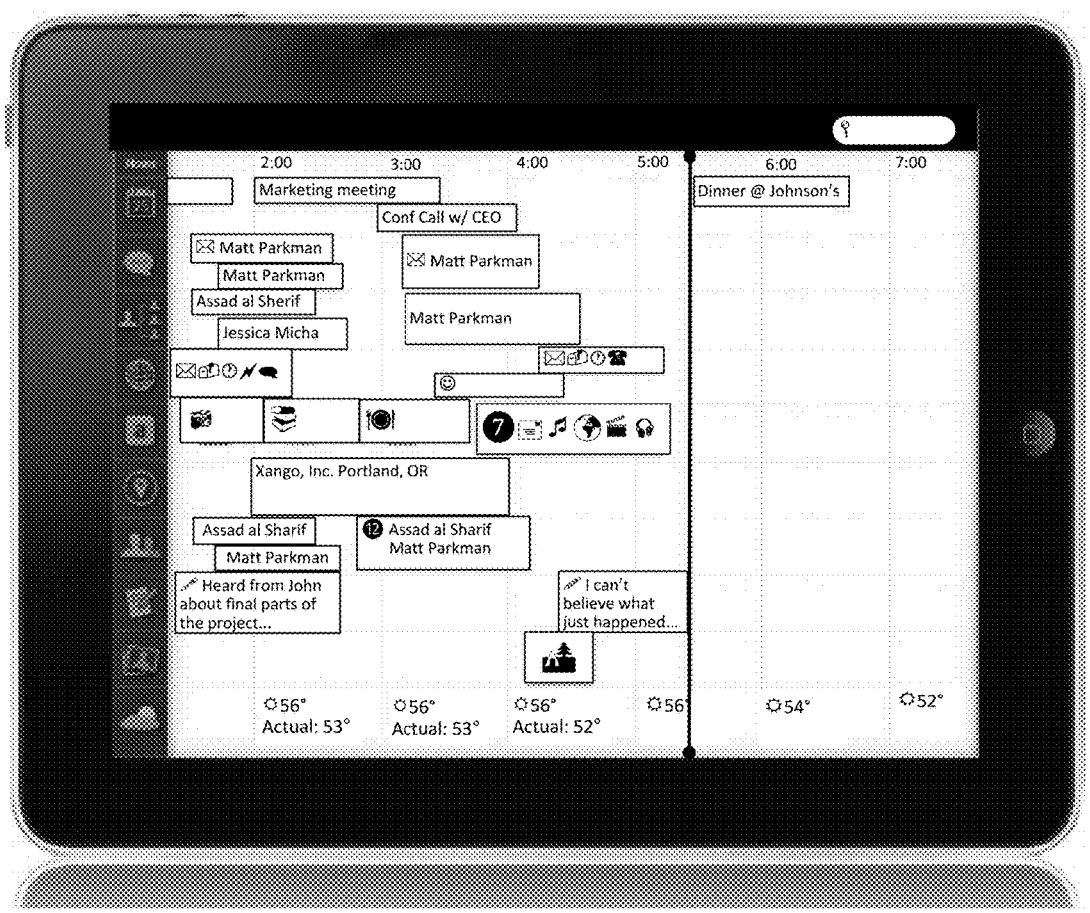
FIG. 1 illustrates an example real-time user interface in the context of an example device, according to an embodiment.

FIG. 1 illustrates a RTUI, as it would appear in a mobile device, such as an iPad™, according to an embodiment. The RTUI is scalable between devices (e.g., phone, desktop, tablet, etc.) as well as across ages (toddler to geriatric). The RTUI is also interactive, and may respond to interactions from a user via one or more input devices, such as a touch-screen, a mouse, a keyboard, and the like.

Figure 2A:
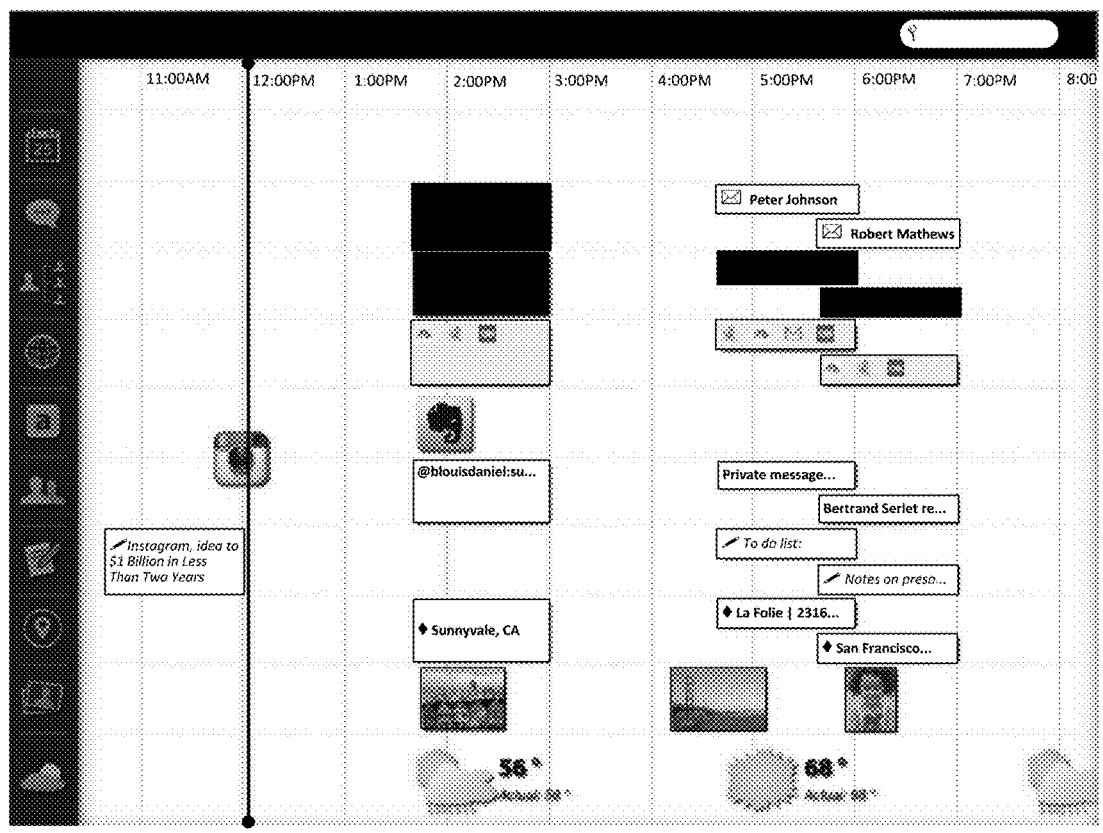
FIGS. 2A-4C illustrate example real-time user interfaces, according to embodiments.

FIG. 2A illustrates a more detailed view of a RTUI, according to an embodiment. The RTUI provides an aggregate view of a user's plurality of social media in a timeline format. At the top of the RTUI, a header can be provided which displays the current day and time, a search box, and/or other features. The search box can be used to search for media, for example, using one or more keywords.

The primary area of the RTUI provides a timeline, with times along one axis, and media categories or modules along the other axis. For example, in the illustrated embodiment, the times are listed horizontally along the x-axis of the display, while the media categories or elements are listed vertically along the y-axis of the display. As can be seen, the time axis comprises a finite time range. The length of this time range may be of any magnitude (e.g., minutes, hours, days), and may be a system or user setting, and/or may be scalable, for example, via user interactions with the RTUI. For example, the timeline may be scaled from one range to a longer range in response to a "pinching" or "spreading" interaction with a touch-screen. The pinching interaction may comprise a user moving two or more fingers (e.g., thumb and index finger) closer to each other from a spread position. In an embodiment, if the timeline is scaled beyond a certain time range, instead of showing each individual element in the timeline, it may instead display the number of items for each media category and for demarcated time periods along the timeline. Conversely, the timeline may be scaled from one range to a shorter range in response to a "spreading" interaction with the touch-screen. The spreading interaction may comprise a user moving two or more fingers (e.g., thumb and index finger) apart from each other. It should be understood that the time markers along the x-axis may be of any magnitude of detail (hours, half-hours, minutes, etc.), and that the level of detail may change in response to a change in the range or scale of the timeline.

Pinching and spreading interactions are described in more detail below. Returning to FIG. 2A, it can be seen that while time is displayed along the bottom, media categories run up and down the left side of the display. Media corresponding to these categories are then displayed in rows across the timeline emanating from or aligning with the position of the related category on the left side. This is a convenient way to organize media by category and time and to see how certain items fit with others at specific times.

Figure 2B:
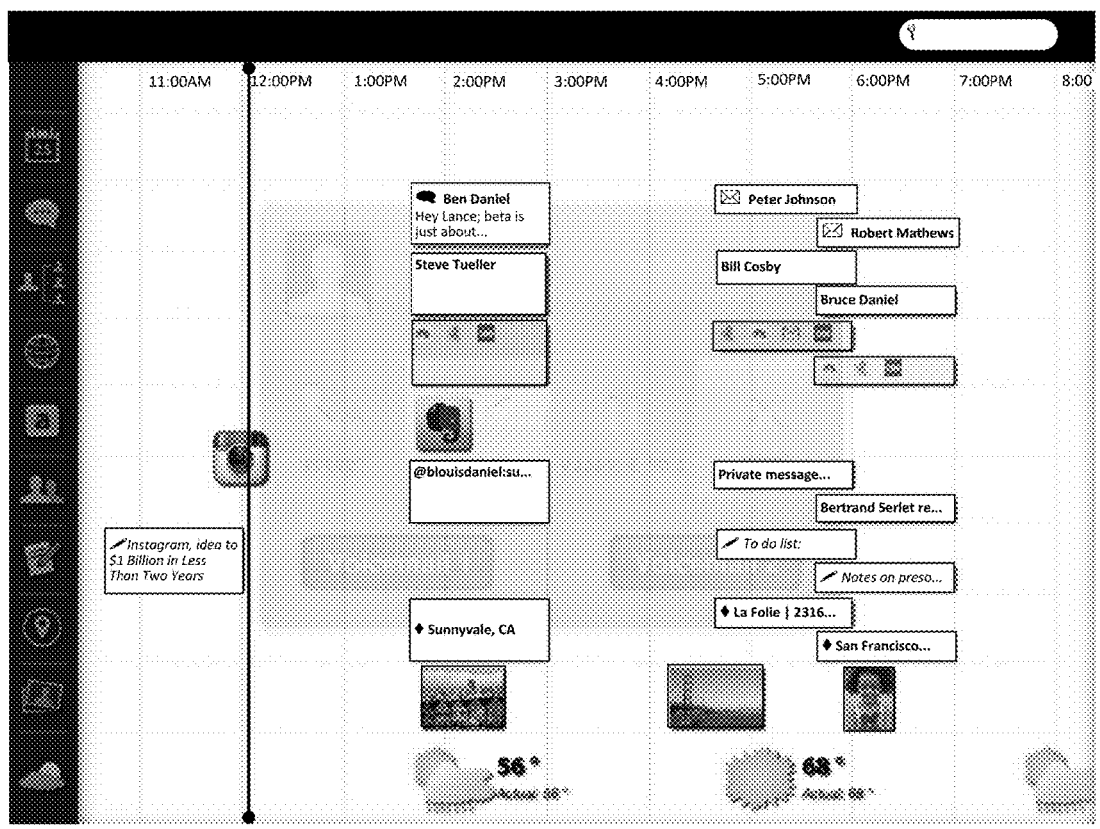

For example, a user may be at a certain location, e.g., Sunnyvale, Calif., at 2:00 pm as illustrated in FIG. 2B. A location indicator can then be displayed on the timeline. The user may have taken a picture and posted it to a social networking site, and may have sent and received various emails, texts, tweets, facebook messages, etc., at or around 2:00 pm. Thus, the timeline can be populated at or about 2:00 pm with the messages, pictures, even weather information, each within its row, so that the user can easily see where they were, what the weather was, what they were doing, who they were communicating with, etc. The user can also easily navigate the timeline by swiping, pinching, etc. This helps the user to keep everything in context, and aids the memory when referring back to events and times.

Moreover, if the user taps or otherwise accesses any of the items in the timeline, he or she can access the associated program or application and see the content, i.e., what they were communicating via the various, communication programs, if they click on the location information a map can appear, the pictures they took, etc. In this way, the timeline is also an archive of events and communications that the user can access at anytime.

Importantly, some of this archive information would be stored on the device, while some would be stored in servers, on the cloud, etc. For example, the system can be configured to have the most recent past stored on the device, while everything past a certain date is on the server. If the user is scrolling through and accessing various points in the archive, the system can be configured to determine what portions of the timeline should be downloaded, i.e., what portions are most likely to be accessed next, and what portions do not need to be downloaded in order to make access appear seamless.

Thus, the user can go to any point in the timeline and see where they were, what they were doing, what they were working on, who they were communicating with, etc., and without the need to open up a bunch of different programs and search through old messages, photos, etc., to try and recreate the timeline.

The pinching and spreading interactions may be usable in any area of the RTUI or in a specified area of the RTUI (e.g., the header bar). In an embodiment, the pinching and spreading interactions may result in different responses or functions depending on where the interaction occurs in the RTUI. For example, if a pinch/spread interaction is used in a first zone of the RTUI, it may result in a change in the scale or range of the timeline. However, if the same interaction is used in a second zone of the RTUI, the RTUI may respond by enlarging or shrinking the rows of the timeline, including the text within them.

Additionally or alternatively, the pinching and spreading interactions may result in different responses or functions depending on the angle at which the interaction occurs. The angle may be defined with respect to the x or y-axis of the RTUI. For example, if the user performs a pinch/spread interaction at substantially a ninety-degree angle from the x-axis, the RTUI may perform one response or function. If the user performs such an interaction at substantially a zero-degree angle from the x-axis, the RTUI may perform a different response or function. Continuing with the example, if the user performs a pinch/spread interaction at a forty-five-degree angle, the RTUI may perform a third response or function, and so on. It should be understood that the angles may not need to be exact, but rather, may correspond to a range of angles. For example, the same response or function may be performed for interactions within twenty-five degrees of a ninety-degree angle (i.e., within an angle of sixty-five degrees and one-hundred-fifteen degrees).

In the illustrated embodiment of FIG. 2A, media categories are listed vertically along the y-axis of the RTUI. In this embodiment, the media categories can be indicated using icons. As shown, the media categories may include, a calendar, communications, relationships, website history, Evernote™, social networking media, journals or notes, locations, photographs, and weather. In an embodiment, a wellness category can also be provided. It should be understood that this list of categories is illustrative and not limiting or exhaustive. In an embodiment, media categories may be defined, added, edited, deleted, and otherwise managed by the user of the RTUI. For example, the user may define a new media category that retrieves information from one or more third-party applications or websites. In one embodiment, certain media categories are provided by default or for free in the RTUI, and the user may download and/or purchase additional media categories for use in the RTUI.

FIG. 2B illustrates an example of the RTUI with an overlay, according to an embodiment. For platforms or devices which comprise functions, alerts, events, etc., such as answering a phone call, an overlay can be generated to prompt the user regarding the event. As shown, the overlay can provide the user with options related to the event. In the case of an incoming phone call, the overlay may identify the caller (e.g., by phone number, name, etc.) and prompt the user to either accept the call, accept and hold the call, reject the call, and/or send the call to one or more voicemails. Notably, in some embodiments, the overlay may be partially transparent, so that the RTUI timeline remains visible underneath the overlay.

If a user interacts with one of the media categories along the axis of the RTUI timeline (e.g., by tapping or clicking on an associated icon), the RTUI may retrieve a more detailed view of that media category. The detailed view may comprise an applet or other application that expands to cover the entire timeline area of the RTUI.

In an embodiment, a calendar or time management media module may be provided. This category may comprise one or more time management elements, arranged on a timeline according to either a start time and end time or a start time and duration associated with each element. When the user selects the time management module, the RTUI can display tools and functions for creating calendar entries, events, reminders, etc. Advantageously, when the user creates the entries, they are automatically, displayed in the main viewing area of FIG. 2 as well. This way, the events can be viewed in context, e.g., with respect to location, other communications occurring around the same time, documents the user may have been working on at the time of the event, etc. Additionally, once created, the user can access the event without the need to open the time management module.

Further, the time management module can be configured with templates for different types of events. Thus, if the user is creating a video conference event, the module can provide a template that the user can use to quickly and easily set up the event. The template can include things like invitees, telephone numbers, documents to be worked on, etc.

Figure 3A:
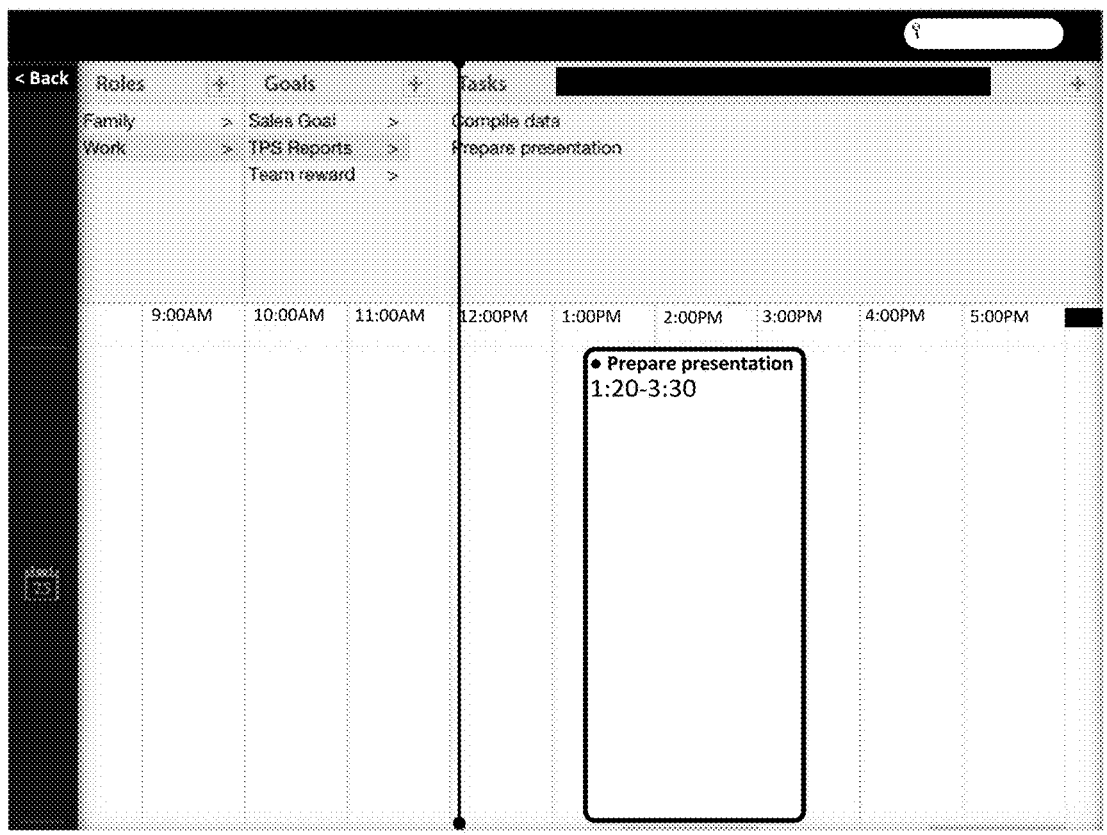

FIG. 3A illustrates an example RTUI corresponding to the time management module, according to an embodiment. As illustrated, the RTUI allows the user to return to the primary or home RTUI, view time management elements, and to define roles, goals, and tasks to facilitate the creation of new time management elements. The RTUI of the time management category may respond to the same types of user interactions as described above with respect to the primary RTUI.

According to an embodiment, a user may define roles, goals, and tasks. There may be a plurality of roles defined by the user and/or by the application (e.g., as defaults). Each role can be associated with one or more goals, and each goal can be associated with one or more tasks. For example, the user may define roles such as "Family," "Work," "Friends," and/or any other social grouping, and the like. Each role can comprise one or more goals. For example, in the illustrated example in FIG. 3A, the "Work" role is associated with the goal of "Sales Goal," "TPS Reports," and "Team Reward." Furthermore, each goal can be associated with one or more task templates. In the illustrated example, the "TPS Reports" goal is associated with the task templates of "Compile Data" and "Prepare Presentation." It should be understood that these roles, goals, and tasks are merely illustrative and not limiting or exhaustive. For example, other task or appointment templates may comprise a video conference call, a shared workspace or whiteboard, a free-form document, etc.

In an embodiment, a user can create a new task by navigating through a hierarchical tree of roles, goals, and task templates, in which the roles and goals comprise internal nodes of the tree and the task templates comprise the leaf nodes of the tree. A user can select the desired task template from the tree to create a new task element from the template. In an embodiment, the selection may comprise dragging the task template from a navigation pane onto the timeline area of the RTUI. The user may be prompted to enter a start and end time or duration of the task, or the start and end time/duration may be at least initially determined from the location at which the user drops the task on the timeline. The user may also be provided with an option to extend or shorten the duration of the task (i.e., change the start and/or end times of the task) by performing a pinch or spread interaction (e.g., along the axis corresponding to the timeline). In this manner, the user can intuitively size the task/appointment (e.g., using his or her fingers) for a particular time and duration.

Figure 3B:
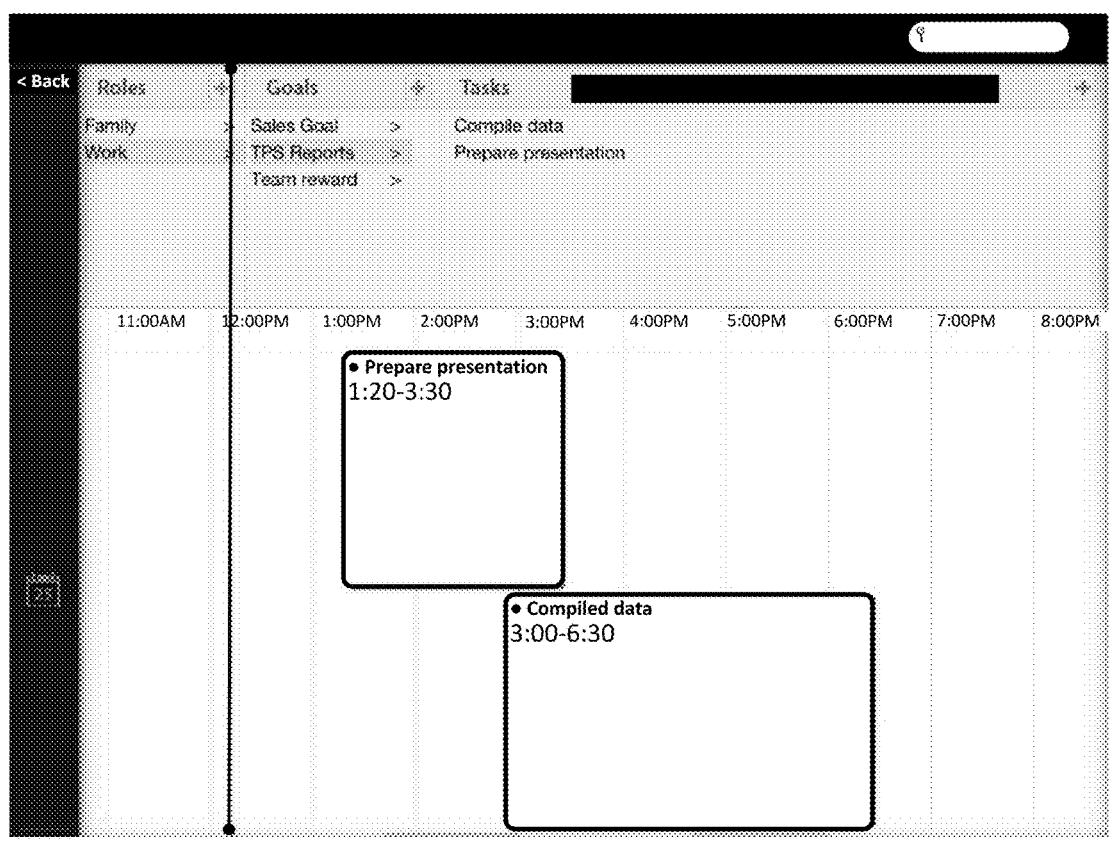

As illustrated in FIG. 3B, the RTUI may be capable of displaying tasks and appointments which overlap in time by scaling down the size of the task/appointment representations (e.g., in the vertical directions) in order to fit two or more representations within the boundaries of the RTUI area. In an embodiment, the RTUI is capable of scaling down elements on the timeline to fit such that all elements fit within the timeline area of the RTUI. In this manner, the user never has to scroll in order to view all his or her tasks/appointments or other elements in the primary timeline display of the RTUI and the detailed views of other media categories. Durations or time periods for individual elements and the chronological relationship between elements can be perceived intuitively. In an embodiment, the representations on the timeline can also be resized (e.g., via pinch/spread interactions) to provide more or less emphasis for individual elements as they relate to other elements.

Advantageously, each role can be associated with a set of one or more contacts (e.g., from a contact or relationship database, list, or address book accessible by the RTUI). For example, the "Family" role may be associated with a plurality of contacts comprising a user's spouse, parents, children, and the like. Similarly, the "Work" role may be associated with one or more contacts comprising a boss and other coworkers. Additionally or alternatively, in some embodiments, each goal and/or task may be associated with a set of one or more possible contacts. Accordingly, when a user selects a task template for adding a new task to the timeline, the user can be prompted to select one or more contacts from the set of contacts associated with the corresponding role, goal, and/or task template. The selected contacts are then associated with the instantiated task placed on the timeline. In this manner, the user is saved the hassle of having to navigate through all of his or her contacts, many of whom may not bear any relation to the given task.

By way of illustration only, a user could create a role of "Family" with a goal of "Help Boys with Little League." This goal can be associated with a task or appointment template for "Practice Catching the Ball." The role, goal, and/or task template can be associated with a set of selectable contacts. For example, the "Family" role may be associated with a spouse, a daughter, and two sons. Thus, when the user creates a new task from the "Practice Catching the Ball" template, he or she need only select one or more contacts from the subset of contacts consisting of the spouse, daughter, and two sons. Alternatively or additionally, the "Help Boys with Little League" goal and/or "Practice Catching the Ball" task template can be associated with the user's two sons. In this case, when the user creates a new task from the "Practice Catching the Ball" template, he or she need only select one or both contacts from the subset of contacts consisting of the two sons.

If a user selects one of the task/appointment elements on the timeline (e.g., by tapping or otherwise interacting with the element in the primary RTUI or specific media category RTUI), a detailed view of the task or appointment can expand to occupy the full or part of the RTUI display area. In addition, if the task or appointment is associated with an action, the action can be automatically initiated or the user can be prompted to initiate the action. For example, if the appointment is video conference with one or more contacts, the expanded view of the appointment can comprise a button or other input which the user can interact with to initiate a video conference with the associated contacts. If the user chooses to initiate the video conference, the RTUI may itself perform the functions necessary to provide the video conference, or may interface with an external application or module to provide the video conference. In this manner, video chats, conference calls, group texts, whiteboard sessions, and the like can each be initiated with one or more contacts from a single application using a single user interaction (e.g., one tap of a touch-screen interface).

An example of an external application that can be integrated with the RTUI to provide video conferencing and other collaborative functions is described in more detail below.

In an embodiment, a relationships category is included among the media categories. The relationships category includes modules that allow user to manage contacts, such as personal and professional acquaintances. The relationships display associated with such modules of the RTUI allows users to add, edit, delete, arrange, and otherwise manage the contacts. The RTUI may obtain contact information from events, communications (e.g., emails, texts, phone calls, etc.), social networks, address books, etc. This information may be stored by the RTUI, e.g., in a database, data file, etc. In an embodiment whenever the user opens a communication, the RTUI application parses the communication and converts contact information into links. Additionally or alternatively, the user may create links from use association. In either case, as soon as the user clicks on the link, the RTUI application can populate one or more tables of a contact database with the contact information.

Figure 4A:
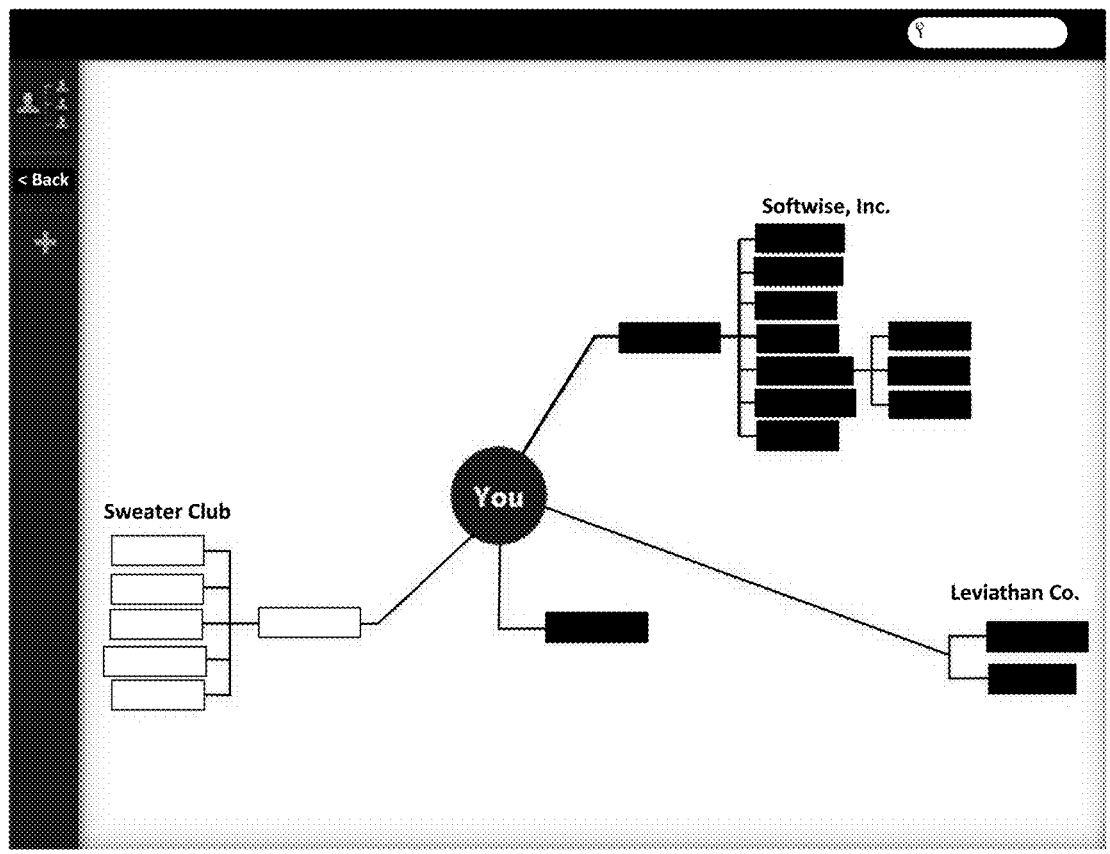

FIG. 4A illustrates an example of the detailed view of the relationships module, which is shown in response to selecting the relationships icon on the primary display of the RTUI, according to an embodiment. As shown, this view can comprise a navigable graph structure, in which the user is represented by a central node, contacts are represented by internal and/or leaf nodes, and relationships are represented by linkages or edges between the nodes. Additionally, it should be understood that relationships may also be defined by internal nodes. Labels may also be assigned to various regions of the graph, e.g., to describe a group of interrelated contacts, such as a family, company, or other social grouping.

The construction of the relationship graph can occur automatically. For example, the module can be configured to scan incoming emails and communications to identify information linking a contact with an organization as well as information identifying their relative position within the organization. The module can then construct the relationship graph based on this information. Alternatively, or in addition, the user can manually create the graphical associations.

The user may navigate the structure by interacting with the RTUI to move the graph or the view of the graph. For example, for platforms with touch-screen interfaces, the user may place and slide his finger on the display area of the RTUI, and the RTUI may respond by sliding the view of the graph in the same direction as the user's finger. For platforms with a mouse, the same response may be achieved using a mouse, instead of a finger.

Figure 4B:
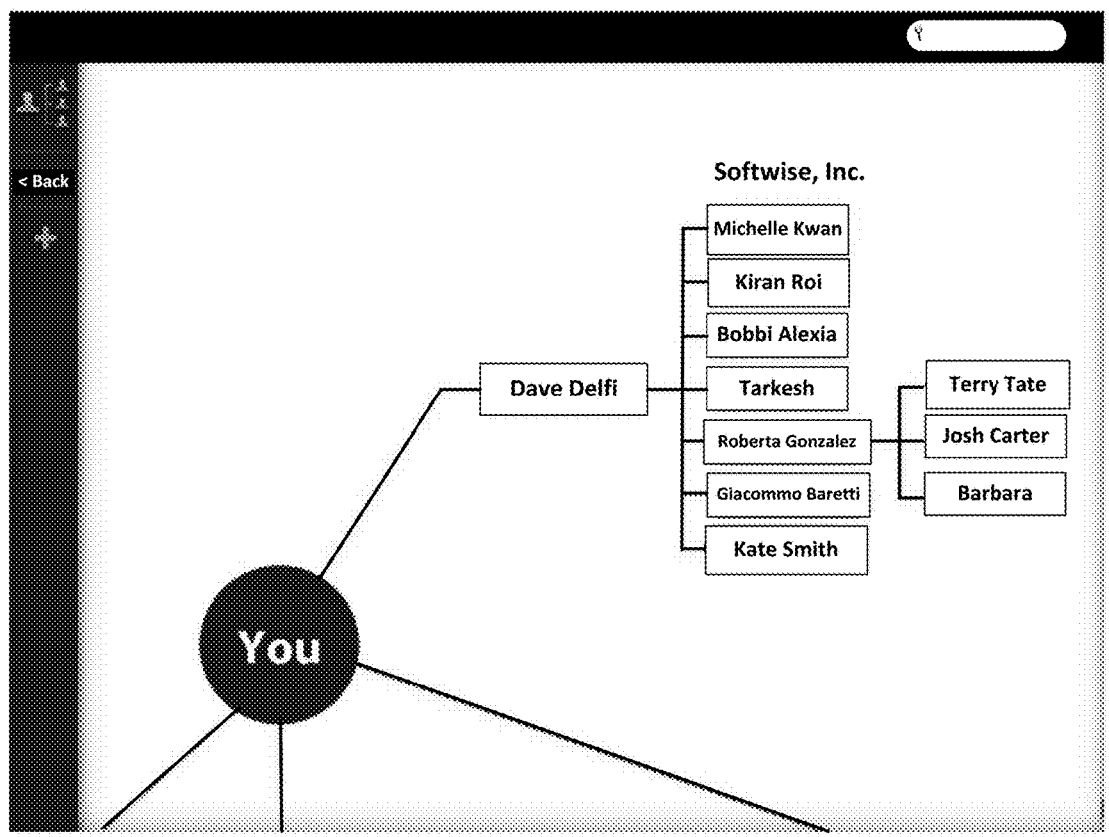

The user may also scale the graph (e.g., zoom in or zoom out) using pinch/spread interactions. FIG. 4B illustrates the result of a spread interaction with a portion of the graph in FIG. 4A. As shown, the RTUI responds by generating a more detailed view of the selected region of the graph. For example, whereas names of the contacts may not fit within the view illustrated in FIG. 4A, names may be shown in the more detailed view illustrated in FIG. 4B. For contacts within the same company, the contacts may be arranged in a hierarchy which represents their position in the company relative to the other contacts. For example, a supervisor may be placed at a parent node with the individuals he or she supervises placed in child nodes. For a family, the parents may be placed in parent nodes with the children placed in child nodes. However, it should be understood that the user may be permitted to arrange the contacts in any hierarchy that he or she desires, and that these hierarchies may not necessarily represent organizational or familial hierarchies.

Figure 4C:
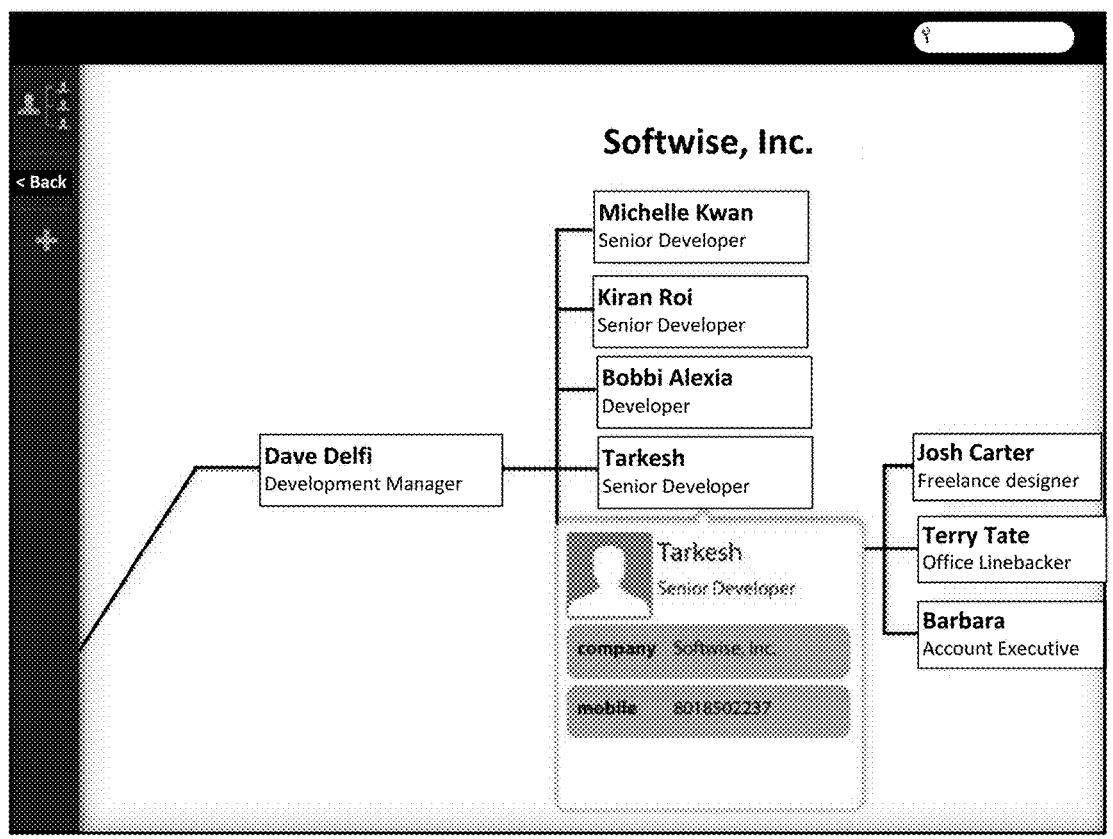

FIG. 4C illustrates a more detailed view of the portion of the graph in FIG. 4B. This view may be obtained, for example, by an additional spread interaction or by selecting one of the nodes (e.g., by tapping it with a finger or clicking it with a mouse). If a user selects a node, a more detailed view of the contact, which may include all or a portion of the contact's contact information (e.g., phone number, email address, website, etc.), as well as other information (e.g., position at a company, etc.), may be displayed. It should be understood that the contact information may be selectable, and in response to a selection, the RTUI may initiate an action (e.g., by accessing an internal or external module, or launching an external application). For example, if a user selects a phone number associated with the contact, the RTUI may prompt the user to initiate a phone call. If the user selects an email address, the RTUI may initiate an email to the contact. If the user selects a website, the RTUI may launch a browser application to retrieve content at the associated Uniform Resource Locator (URL).

In an alternative embodiment, the relationships category may simply comprise a list of contacts, rather than the above described contacts tree.

As illustrated in FIG. 2A, the RTUI may also include a website history category. An icon representing a visited website (e.g., the Favicon provided by the website) can be placed on the timeline at roughly the position in time at which the website was retrieved.

As illustrated in FIG. 2A, the RTUI may also include a social networking category, which aggregates notifications, messages, events, alerts, postings, etc., from one or more social networking sites, such as Twitter™, Facebook™, Google+™, and the like. The notifications can be pinned to the RTUI timeline in roughly chronological order.

As illustrated in FIG. 2A, the RTUI may also include a journal or notes category, which aggregates journal entries or notes written by the user using one or more journal or note applications. The entries and notes can be pinned to the RTUI timeline according to the time that they were written, saved, or modified. These journal entries can easily be posted or exported to one or more of a user's social media accounts from the same screen wherein the journal entry is made.

As illustrated in FIG. 2A, the RTUI may also include a locations category. Each time a user "checks" in to a location, a representation (e.g., textual or graphical representation) of the location may be pinned to the RTUI timeline according to the time of the check-in. For example, a user may check in to a location using a location-based social networking site or application, such as Foursquare™. If a user selects a location representation on the timeline (e.g., by tapping or clicking the representation), a map or other information related to the location may be displayed. Additionally, the user may elect to have the location monitored on a regular or continuous basis automatically without the need to check in.

As illustrated in FIG. 2A, the RTUI may also include a photograph category, with thumbnails pinned to the RTUI timeline according to when the associated photographs were captured or otherwise obtained. In an embodiment, a user interaction with the thumbnail image (e.g., a tap or a click) prompts the user to post or send the photograph to one or more social media websites. In this case, the RTUI may utilize an application programming interface (API) of the social media website to send and post the photograph to the website over a network, such as the Internet. Additional data might also be aggregated and shared with the social media website. For example, when sharing a photo with Facebook, it could also share the location, weather, and etcetera at the moment the photo was taken with the social media website(s).

As illustrated in FIG. 2A, the RTUI may also include a weather category which displays chronological weather information for various times on the timeline (e.g., for each hour). This weather information may include current weather, forecasts of the weather at a future time (e.g., received from a weather feed), and historical weather information at a past time.

In an embodiment, a cloud component is provided, which permits storage and syncing across multiple devices. FIG. 5 illustrates a system with a cloud component, according to an embodiment. Multiple user devices 102 may communicate with one or more servers or cloud instances 106. User data 108 (e.g., stored in one or more databases) may be locally and/or remotely accessible to servers 106. The user data 108 may comprise, for example, the user's RTUI configuration, settings, media categories, user profile, account information with the RTUI provider, account information for one or more social media providers, past, present, and future elements within the user's RTUI timeline (e.g., tasks, appointments, communications, notes, etc.), and the like.

In this embodiment, at least the bulk of the data necessary to operate the RTUI on each device 102 is stored at or accessible to the server 106, instead of on the devices 102 themselves. However, in an embodiment, metadata, such as times, icons, etc., may be stored locally on the devices 102. Each device 102 may access the RTUI using a thin client application or a standard browser application stored and/or executed on the device 102. The device 102 may only store (e.g., temporarily) as much data as is necessary to present a current view of the RTUI timeline to the user. In an embodiment, the device 102 may prefetch and/or preload additional data based on user interactions or previous usage behavior. For instance, if the user begins scrolling the timeline, the device 102 may prefetch and/or preload content necessary to display periods of the timeline beyond that which is necessary to display the period requested by the user. By way of illustration, if the user begins scrolling the timeline to a past period, the device 102 may display the past period, as well as retrieve even earlier periods in anticipation of the user continuing to scroll to the earlier periods.

Since the bulk of the necessary data is stored at a central location, the user data can be automatically synchronized between each device and platform. That is to say, each device accesses the same centralized user data to build each RTUI view. Each device can be provided with the same, consistent view of the RTUI. Alternatively, the RTUI may be adapted to appear differently depending on the capabilities of the device or platform.

It should also be noted that in certain embodiments, the RTUI can be launched by rotating the device on which it is running. Also, in an embodiment, the user interface can be provided in Hypertext Markup Language (HTML), including HTML5.

As noted above, one type of tool that can be included and integrated with the RTUI is a collaboration tool. In such a tool, the user can create a collaboration environment that includes all of the documents, videos, links, etc., needed in a collaboration and then invite the required participants. These participants could then access the environment and collaborate. When the collaboration session was complete, the session would be saved in the timeline so that the collaborators can easily start the next session where they left off of the last session. The following description described a tool that can be used for such collaboration.

FIG. 7 illustrates an example network which may be utilized with the disclosed systems and methods, according to an embodiment. The system comprises a set of one or more servers 130 which might store data, host and/or execute one or more of the various software modules, user interfaces, and/or processes described herein. In addition, the server(s) 130 are communicatively connected to one or more user devices 110 via one or more network(s) 120. The network(s) 120 may comprise the Internet. Server(s) 130 may communicate with user system(s) or device(s) 110 through the Internet using standard transmission protocols, such as HyperText Transfer Protocol (HTTP), Secure HTTP (HTTPS), File Transfer Protocol (FTP), and the like. In an alternative embodiment, server(s) 130 may not be dedicated servers, and may instead be cloud instances, which utilize shared resources of one or more servers. User device(s) 110 may comprise any type or types of computing devices capable of wired and/or wireless communication, including without limitation, desktop computers, laptop computers, tablet computers, smart phones or other mobile phones, and servers.

Server(s) 130 may comprise web servers which host one or more websites or web services. In embodiments in which a website is provided, the website may comprise one or more user interfaces, including, for example, webpages generated in HyperText Markup Language (HTML) or other language. The server(s) 130 transmit or serve these user interfaces in response to requests from user device(s) 110. The requests and the responses, including the user interfaces, may both be communicated through network(s) 120, which may include the Internet, using standard communication protocols (e.g., HTTP, HTTPS). These user interfaces or webpages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like. The server may also respond to other requests from the user device(s) 110. For example, a user system may submit data (e.g., user data, form data, etc.) to be stored in one or more databases locally and/or remotely accessible to the server(s) 130. Such data may be sent to the server(s) 130, for instance, using the well-known POST request supported by HTTP. This data, as well as other requests, may be handled, for example, by a servlet executed by the server(s) 130.

In embodiments in which a web service is provided, the server(s) 130 may receive requests from user device(s) 110, and provide responses in eXtensible Markup Language (XML) and/or another suitable format. In such embodiments, the server(s) 130 may provide an application programming interface (API) which defines the manner in which user device(s) 110 may interact with the web service. Thus, the user device(s) 110, which may themselves be servers, can define their own user interfaces, and rely on the web service to implement the backend processes, functionality, storage, etc., described herein.

The system may comprise one or more executable software modules which implement one or more of the user interfaces or processes discussed herein. These modules may be written using any suitable programming and/or scripting languages or frameworks, including without limitation Javascript, Hypertext Markup Language (HTML), Cascading Style Sheets (CSS), PHP, Node.js, Java, C/C++, .NET, Visual Basic, Perl, etc. In one embodiment, the backend may be built entirely using Javascript and URLs. In addition, the modules may implement APIs with third-party applications, such as as Bit.ly™, Firebase™, Xobni™, Rapportive™, Evernote™, JetLore™, etc.

The software modules may reside and/or be executed on the server(s) 130, the user device(s) 110, or a combination of the server(s) 130 and the user device(s) 110. For instance, in a server-heavy application, the majority of processing and/or data storage may be performed by server(s) 130. In this case, a user device may not need any specialized software (e.g., other than a web browser) or may utilize a thin client application to utilize the system. In contrast, in a client-side application, the majority of processing and/or data storage may be performed by a client application residing and executed on the user device(s) 110. For instance, the server(s) 130 may merely provide data storage and/or modules for data sharing between users.

In an embodiment, users of user device(s) 110 can create an account with server(s) 130, for example, by registering with server(s) 130. Registration may comprise providing user data to server(s) 130, such as a username and password or other credentials for authentication, personal information (e.g., name, contact information), and/or additional information.

In an embodiment, users of user device(s) 110 can create one or more collections of content. This content may include websites, web portals, applications including web "apps," media (e.g., images, videos, documents or other files), and the like, including combinations of these different types of content. Each collection can be represented by and stored as a page comprising the content items or elements selected for the collection. These collection page(s) can be associated with the user account (e.g., by associating an identifier of the collection page with an identifier of the user account in one or more databases).

In an embodiment, websites may be added to a page for a collection via a browser application or bookmarklet, by copying-and-pasting and/or dragging-and-dropping a link to the website onto the page. In an embodiment, content items are presented in a graphical way, as opposed to a long list of links (e.g., URLs). For instance, in the case of websites, images and/or video, previews may be scraped from each of the websites and laid out in a grid pattern. In an embodiment, there is no required pattern, such that a user may position the content items in any free-form manner. Each content item may be presented in a consistent manner, regardless of the type of content. Content items, such as images, videos, and documents (e.g., Portable Document Format), may be fully rendered.

In an embodiment, a user interface is provided. The user interface may comprise one or more panels. A primary panel may comprise a collection or page of content being managed by a user. The primary panel may be the only panel that is initially visible. Additional panels may "fly out" from the sides of the user interface in response to user interactions (e.g., swipes), and may also be hidden in response to user interactions (e.g., reversed swipes).

In an embodiment, comments and tagging structures may be embedded in a collection page. In this manner, the system may provide an organized, communal, and searchable resource with trending collections and content.

FIGS. 8A-8C illustrate a portion of a user interface for managing a collection, according to an embodiment. In this embodiment, a user may toggle between a locked/activated view and an editable/meta view for the collection. For instance, the user may touch an edit icon to switch to the editable meta view, as shown in FIG. 8A. The view will be editable, as shown in FIG. 8B, until the meta view is toggled off to the locked view. For example, as shown in FIG. 8C, an icon may be slid to return to the locked/activated view. In this case, the edit mode is activated as soon as a finger touches the icon, and stays in this mode until the user lets go of the icon or slides the soft switch into the "Edit" position FIGS. 9A-9C illustrate a portion of an editable meta view of a collection, according to an embodiment. The user may resize content items within the collection, for example, by using pinching and/or spreading interactions with a touch-screen interface. For example, a user may pinch two fingers together on the content item to shrink the item, and spread two fingers apart on the content item to enlarge the item. The user may also reposition content items, for example, by touching an item and dragging it to a new position.

A user may also edit one or more attributes or properties of a content item or element in a collection. FIG. 10 illustrates an example of how one or more attributes of a content item may be viewed and/or edited. For instance, each content item may be associated with an edit icon. If the user selects the edit icon associated with the content item, the attributes associated with the item may be displayed and/or edited. These attributes may include, for example, a label or title, a URL associated with the content (e.g., the location of the content), hashtags associated with the item, and/or an option to delete the content item from the collection. In an embodiment, the content of the collection may remain live and active (i.e., viewable by other users) while being edited and altered (e.g., resized, repositioned, attributes modified).

In an embodiment, the user interface for a collection comprises a pallet panel (e.g., at the bottom of the user interface). The pallet may be initially hidden, and may be displayed when a user interacts with the user interface (e.g., by swiping up from the bottom of the user interface with one, two, or more fingers). The pallet allows a user to add annotations, web applications, and/or custom script(s) to a collection page. These elements may be based off of common application programming interfaces (APIs) to encourage the user to take full advantage of the services and applications that they already use.

FIGS. 11A and 11B illustrate an example of a user interface comprising a collection and a pallet, according to an embodiment. In FIG. 11A, no content items currently exist in the collection. Accordingly, only the pallet is visible. However, as shown in FIG. 11B, a user may drag an item, such as a web application or "app," from the pallet and "drop" the item into the collection. The user may then resize, reposition, or edit the attributes of the item, as described elsewhere herein. As shown in FIGS. 11A and 11B, the pallet may comprise a plurality of drag-and-drop "apps" or other elements or containers available to a user. The pallet can comprise both static content (e.g., files) and dynamic content (e.g., web apps). The pallet can be open to third-party application developers, whose applications can be made available on the pallet.

FIGS. 12A and 12B illustrate a scripting box, according to an embodiment. A scripting box permits users to instantly run complete web applications by pasting in or uploading code and/or supporting files. FIG. 12A illustrates a scripting box in the default, activated view. The user may upload, run, type in, or paste in code to the scripting box, which will generate an active content item. FIG. 12B illustrates a scripting box in an editable meta view. In this case, the user may type in or paste in code into the scripting box, or select an edit icon to upload or submit a content item to the scripting box, associate hashtags with the scripting box, and/or delete the scripting box.

Figure 13:
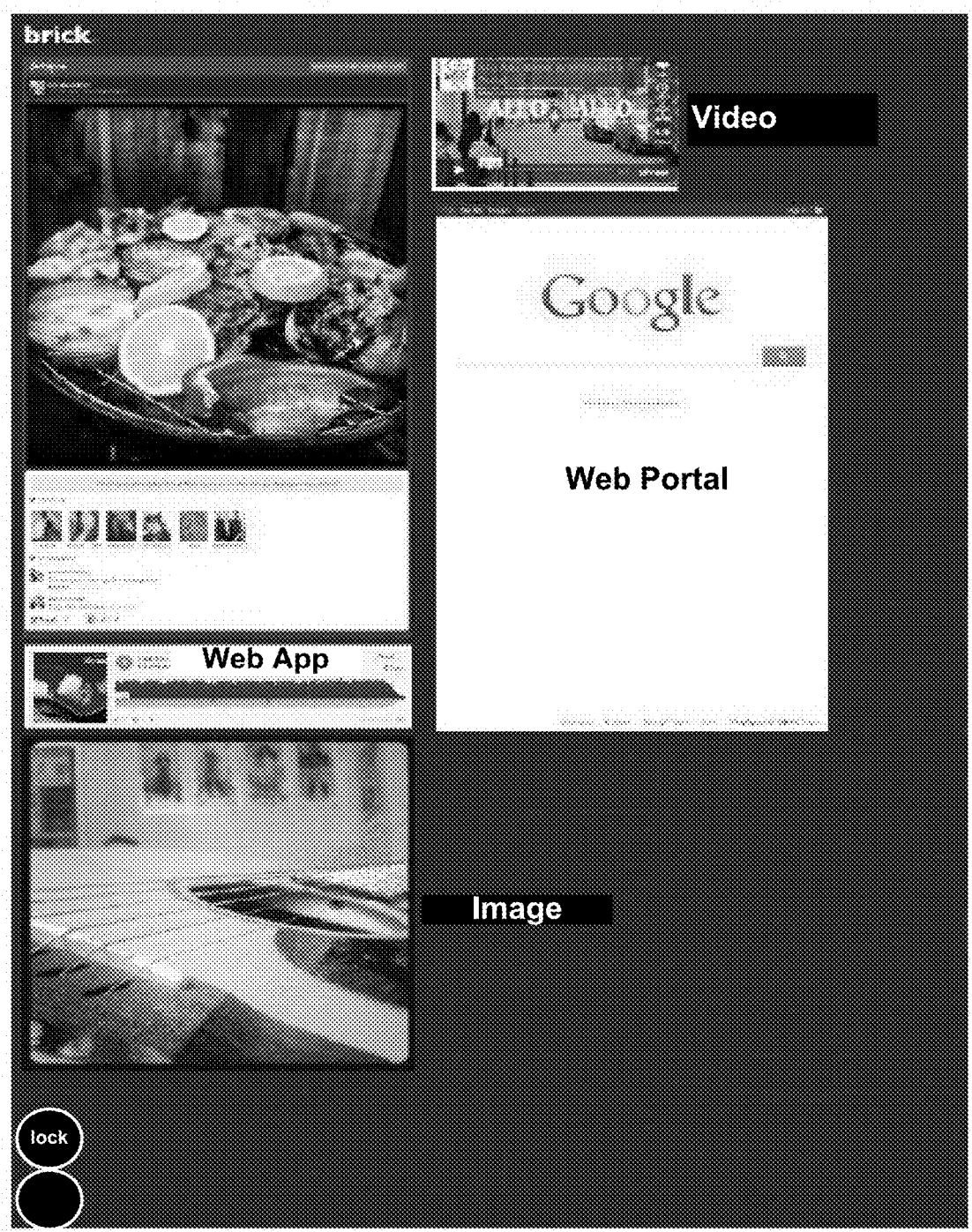
FIG. 13 illustrates a collection panel of a user interface, according to an embodiment.

FIG. 13 illustrates an example view of a page corresponding to a collection, according to an embodiment. As shown, the page comprises a plurality of content items, including a social networking post with an image and comments, a video, a web portal, a web app, and an image. The page acts as a visual framework which enables users to place and view multiple web views (or portals), web apps, images, videos, and/or files on the same surface. The page can be navigated utilizing user interactions with an input device, such as a mouse or touch-screen. For example, if the user device supports touch interactions through a touch-screen, the user may swipe the touch-screen to pan the display left, right, up, and/or down, and pinch or spread two fingers to zoom in and out on the display.

In an embodiment, the user interface may comprise a visual clipboard or draft surface. FIG. 14 illustrates such a clipboard panel, according to an embodiment. The clipboard panel may be initially hidden, and may be displayed when a user interacts with the user interface (e.g., by swiping down from the top of the user interface with one, two, or more fingers). A user may drag or cut-and-paste content items onto the clipboard panel. The content items may remain on the clipboard, regardless of what page, collection, or content item the user is viewing or editing, until they are deleted or otherwise cleared from the clipboard. A user may also drag or cut-and-paste content items from the clipboard panel onto one or more pages or collections being edited.

Figure 15:
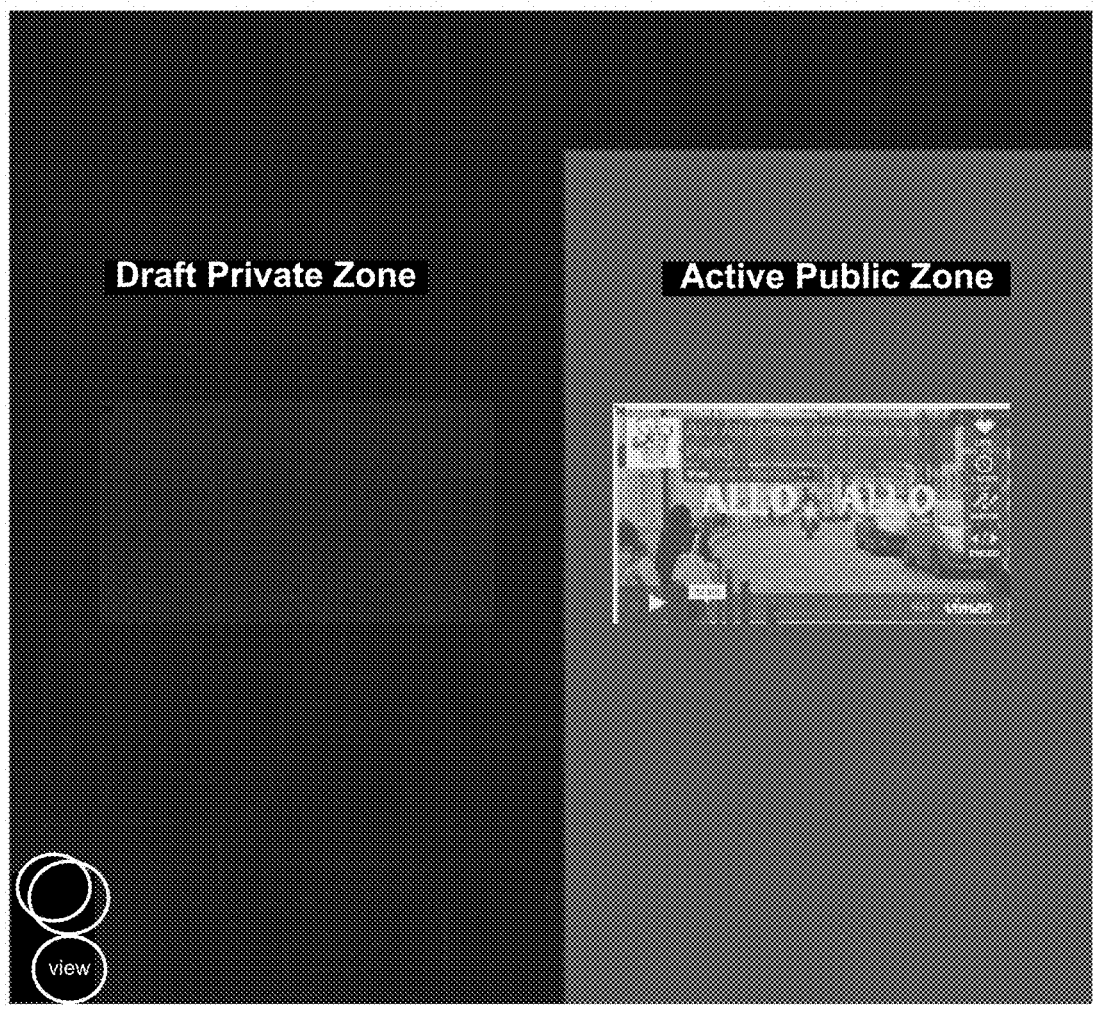
FIG. 15 illustrates a private zone panel and public zone panel of a user interface, according to an embodiment.

In an embodiment, the user interface may also comprise visual private zone and public zone panels, as illustrated in FIG. 15. Content items may be dragged and/or cut-and-pasted from the private zone panel to the public zone panel, and from the public zone panel to the private zone panel. Content items in the public zone panel are viewable to other users, whereas content items in the private zone panel are not viewable. In an embodiment, as soon as a content item is moved from the private zone panel to the public zone panel, it is immediately viewable to other users as part of the collection.

In an embodiment, a user can share an entire collection/page of content by dragging one or more contacts from a contact list onto the page in question and/or by dragging the page onto one or more contacts in a list of contacts. In an additional embodiment, a user may share an individual content item by dragging one or more contacts directly onto the item, and/or by dragging the item onto the contacts.

In an embodiment, the user interface may comprise a fly-out contacts panel which comprises a list of contacts. The contacts panel may be initially hidden, and may be displayed when a user interacts with the user interface (e.g., by swiping from left to right across the user interface with one or two or more fingers). The list of contacts may comprise a name, icon (e.g., image, avatar, etc.), or other identifier for each contact. In an embodiment, the user can drag one or more contact identifiers from the contact panel onto the primary panel in order to share the collection represented by the primary panel with the contacts corresponding to the selected contact identifiers. In an additional embodiment, the user may drag the contact identifier(s) from the contact panel onto individual content items in the primary panel to share just those contact items with the corresponding contact(s).

Figure 16:
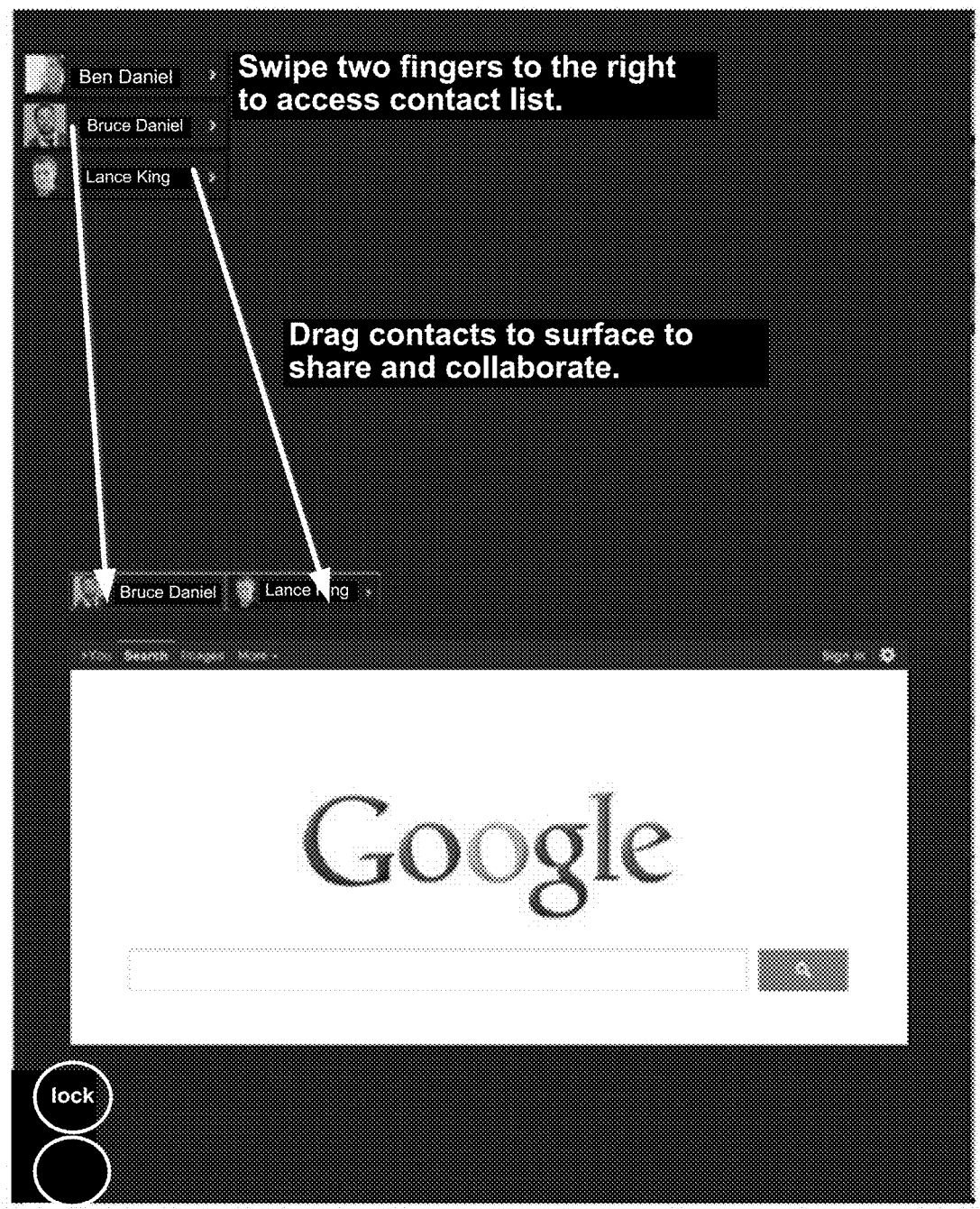
FIG. 16 illustrates a collection panel and contacts panel of a user interface, according to an embodiment.

FIG. 16 illustrates a contacts panel, according to an embodiment. As shown, the contacts list can comprise an identification for each contact, including an image and name for the contact. The identification can be dragged to the primary panel or surface to share the collection currently represented on the primary panel with the corresponding client. In an embodiment, the user and the contacts with which the collection is shared may be permitted to collaborate in real time on the collection. For example, dragging the contact onto the collection (or vice versa) may provide the contact with permissions to modify or otherwise manage the collection (e.g., adding, deleting, or modifying attributes of collection items).

Figure 17:
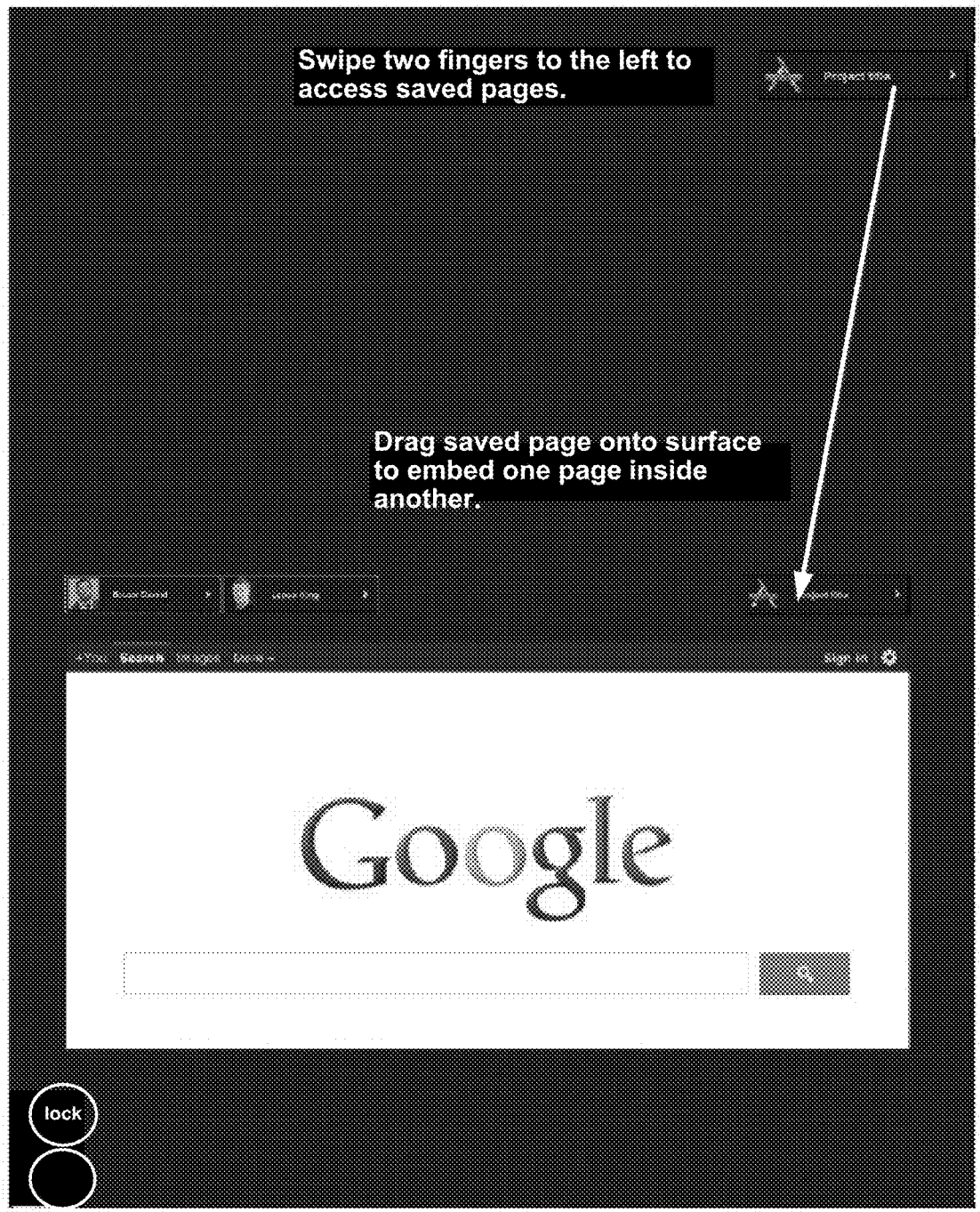
FIG. 17 illustrates a collection panel and organization panel of a user interface, according to an embodiment.

In an embodiment, the system may allow collection pages to be hierarchically arranged, for example, in a tree or tree-like structure. The user interface may comprise an organization panel, which allows a user to hierarchically arrange collection pages. The organization panel may be initially hidden, and may be displayed when a user interacts with the user interface (e.g., by swiping from right to left across the user interface with one or two or more fingers). FIG. 17 illustrates an organization panel, according to an embodiment. As shown, the organization panel can comprise an identification for each folder, project, or collection. The user may able to select an identification of a folder or project to expand that folder or project (e.g., to view sub-folders, sub-projects, individual collections) or collapse the folder or project (e.g., hide the sub-folders, sub-projects, or individual collections). The user may drag or cut-and-paste a folder, project, and/or collection from the organization panel onto the primary panel corresponding to a collection, or vice versa, to associate the collection with the folder or project. In this manner, a collection page can be embedded into another collection page. For example, a user may drag a first collection from the organization panel onto a primary panel corresponding to a second collection to embed the first collection into the second collection, or to embed the second collection into the first collection, depending on the particular implementation. In an embodiment, modifying the hierarchy of collections does not affect the location of the collection pages (e.g., the URL for accessing the collection page remains the same).

In an embodiment, users may instantly publish a collection or page simply by toggling a public/private switch or other input. For instance, when the user toggles the switch to public, the page may be instantly published at an automatically generated URL, such as "spot.com/#pagename/@username". Users may be permitted to view a published or shared collection without registering or otherwise establishing an account with the system.

In an embodiment, registered users (i.e., users who have established an account with the system) may be offered online file storage for their collections. Such users may be given a certain amount of storage space for their collections for free (e.g., 10 GBs), as well as limited file sizes and/or lower upload priorities. Paying users may be provided greater storage space, files sizes, and/or higher upload priorities. Users may be charged a subscription fee. However, in an alternative embodiment, paying users may pay a one-time fee, and not be required to pay recurring subscription fees. For example, by way of illustration, a user may pay a one-time fee of $1 per 1 GB of storage with discounts available for volume purchases (e.g., $95 for 100 GB, $210 for 250 GB, $299 for 500 GB, and so on).

FIG. 6 is a block diagram illustrating an example wired or wireless system 550 that may be used in connection with various embodiments described herein. For example the system 550 may be used as or in conjunction with one or more of the modules or applications, as previously described above. The system 550 can be a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560, such as one or more of the modules discussed above. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or an external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, a cellular data interface, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described. Additionally, some code may be executed on remote servers to reduce the power and computing requirements on the local device, or to improve performance.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that were previously described with respect to FIGS. 2 and 3.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system for providing an aggregate view of a user's plurality of social media in a timeline comprising:
   a device having a display screen;
   at least one hardware processor; and
   at least one software module configured to, when executed by the at least one hardware processor, perform operations of:
   displaying, on the display screen, a graphical user interface having the timeline including a plurality or rows and a plurality of columns, the timeline listing times horizontally along the top row of a x-axis of the display screen and is scalable in a specific time range based on a user input with the graphical user interface while a set of content categories represented by icons are listed vertically along the leftmost column of a y-axis of the display screen,
   each content category being associated with a row and one or more columns across the timeline, wherein each content category is associated with at least one type of media and an application, and the at least one type of media is associated with applications of at least one of a calendar, communications, relationships, website history, social networking media, journals or notes, locations, photographs, or weather that aggregate at least one of notifications, messages, events, alerts, postings, location information, or visited websites;
   as each content is created or consumed using the respective application, populating, on the display screen, the timeline with a selectable representation of the content in the row or column associated with the content category corresponding to the content at a point of the times on the timeline representing a time at which the content was created or consumed, the selectable representation representing a corresponding media type or respective application;
   receiving, via one or more servers or cloud instances, a plurality of indications of consumed content associated with one or more types of media at a specific period of time;
   populating, on the display screen, the timeline with a plurality of selectable representations of the consumed content on the graphical user interface, each selectable representation of the consumed content is placed in a row or column aligned with a respective type of media at the specific period of time of the timeline;
   selecting, by the user, one of the plurality of selectable representations of the consumed content placed on the timeline of the graphical user interface; and
   in response to the selection of the one of the plurality of selectable representations of the consumed content, launching the respective application in a state in which the content was created or consumed such that content is accessible to the user via the selectable representation of the content created or consumed.

2. The system of claim 1, wherein the at least one software module is further configured to expand or contract the timeline in response to a user operation.

3. The system of claim 1, wherein the at least one software module is further configured to adjust a time period represented by the timeline in response to a user operation.

4. The system of claim 1, wherein the content categories comprise a content category associated with a collaboration tool application.

5. The system of claim 1, wherein the content categories comprise a content category associated with a contact sorter application configured to:
   automatically access and analyze communications, wherein the communications comprise one or more of an email message, voice message, text message, social media message, social network message, and instant message;
   automatically identify contact information from the communications;
   automatically populate a contact database with the identified contact information; and
   populate a graphical contacts user interface based on the contact database, wherein the contacts user interface comprises representations of contacts organized in a hub-and-spokes configuration, wherein the hub-and-spokes configuration comprises a representation of the user as a hub surrounded by one or more spokes and a representation of a group of one or more contacts at the end of each of the one or more spokes, wherein each group is based on a common affiliation between the one or more contacts in the group.

6. The system of claim 5, wherein one or more representations of a group comprise a plurality of representations of contacts arranged in a hierarchy associated with the common affiliation, and wherein each representation of a group and its hierarchy are configured to be modified by the user.

7. The system of claim 1, wherein the content categories comprise a content category associated with a calendar application configured to:
   store a plurality of roles, wherein each role is associated with one or more goals, and wherein each goal is associated with one or more tasks;
   receive a selection of a task;
   in response to the selection of the task, generate a calendar item based on a template associated with the task; and
   populate the row or column in the timeline associated with the calendar application with a representation of the calendar item.

8. The system of claim 7, wherein the calendar item comprises one or more of a date, time, one or more invitees, and content.

9. The system of claim 7, wherein the selection of the role, goal, and task comprises dragging the task onto the timeline.

10. A method for providing an aggregate view of a user's plurality of social media in a timeline, the method comprising:
    displaying a graphical user interface on a display screen of a device, the graphical user interface having the timeline including a plurality or rows and a plurality of columns, the timeline listing times horizontally along the top row of a x-axis of the display screen and is scalable in a specific time range based on a user input with the graphical user interface while a set of content categories represented by icons are listed vertically along the leftmost column of a y-axis of the display screen,
      each content category being associated with a row and one or more columns across the timeline, wherein each content category is associated with at least one type of media and an application, and the at least one type of media is associated with applications of at least one of a calendar, communications, relationships, website history, social networking media, journals or notes, locations, photographs, or weather that aggregate at least one of notifications, messages, events, alerts, postings, location information, or visited websites;
    as each content is created or consumed using the respective application, populating, on the display screen, the timeline with a selectable representation of the content in the row or column associated with the content category corresponding to the content at a point of the times on the timeline representing a time at which the content was created or consumed, the selectable representation representing a corresponding media type or respective application;
    receiving, via one or more servers or cloud instances, a plurality of indications of consumed content associated with one or more types of media at a specific period of time;
    populating, on the display screen, the timeline with a plurality of selectable representations of the consumed content on the graphical user interface, each selectable representation of the consumed content is placed in a row or column aligned with a respective type of media at the specific period of time of the timeline;
    selecting, by the user, one of the plurality of selectable representations of the consumed content placed on the timeline of the graphical user interface; and
    in response to the selection of the one of the plurality of selectable representations of the consumed content, launching the respective application in a state in which the content was created or consumed such that content is accessible to the user via the selectable representation of the content created or consumed.

11. The method of claim 10, further comprising expanding or contracting the timeline in response to a user operation.

12. The method of claim 10, further comprising adjusting a time period represented by the timeline in response to a user operation.

13. The method of claim 10, wherein the content categories comprise a content category associated with a collaboration tool application.

14. The method of claim 10, wherein the content categories comprise a content category associated with a contact sorter application, and wherein the method further comprises using the at least one hardware processor to execute the contact sorter application to:
    automatically access and analyze communications, wherein the communications comprise one or more of an email message, voice message, text message, social media message, social network message, and instant message;
    automatically identify contact information from the communications;
    automatically populate a contact database with the identified contact information; and
    populate a graphical contacts user interface based on the contact database, wherein the contacts user interface comprises representations of contacts organized in a hub-and-spokes configuration, wherein the hub-and-spokes configuration comprises a representation of the user as a hub surrounded by one or more spokes and a representation of a group of one or more contacts at the end of each of the one or more spokes, wherein each group is based on a common affiliation between the one or more contacts in the group.

15. The method of claim 14, wherein one or more representations of a group comprise a plurality of representations of contacts arranged in a hierarchy associated with the common affiliation, and wherein each representation of a group and its hierarchy are configured to be modified by the user.

16. The method of claim 10, wherein the content categories comprise a content category associated with a calendar application, and wherein the method further comprises using the at least one hardware processor to execute the calendar application to:
   store a plurality of roles, wherein each role is associated with one or more goals, and wherein each goal is associated with one or more tasks;
   receive a selection of a task;
   in response to the selection of the task, generate a calendar item based on a template associated with the task; and
   populate the row or column in the timeline associated with the calendar application with a representation of the calendar item.

17. The method of claim 16, wherein the calendar item comprises one or more of a date, time, one or more invitees, and content.

18. The method of claim 16, wherein the selection of the role, goal, and task comprises dragging the task onto the timeline.

* * * * *